Feb. 28, 1956 M. CAMRAS 2,736,776

MAGNETIC RECORDER HEAD ASSEMBLY

Filed June 2, 1951

Inventor
Marvin Camras by Hill, Sherman, Meroni, Gross & Simpson Attys

United States Patent Office 2,736,776
Patented Feb. 28, 1956

2,736,776

MAGNETIC RECORDER HEAD ASSEMBLY

Marvin Camras, Chicago, Ill., assignor to Armour Research Foundation of Illinois Institute of Technology, Chicago, Ill., a corporation of Illinois Application June 2, 1951, Serial No. 229,620

5 Claims. (Cl. 179—100.2)

This invention relates to a magnetic recorder head assembly, and more particularly, to an improved relation of electromagnetic transducer heads in magnetic recording and reproducing apparatus.

The term "electromagnetic transducer head" is used herein in its broad accepted sense of referring to either a magnetic head used for erase purposes, a magnetic head used for recording purposes, or a magnetic head used for reproducing purposes.

One of the principal features and objects of the present invention is to provide an assembly of electromagnetic transducer heads in which the first of a series of two or more heads has a greater width of effective contact with the magnetic record member than a successive head across which the record member later crosses.

Another and further object of the present invention is to provide a novel electromagnetic transducer head assembly including an erase head and a record head over which a record member is arranged to pass in succession, the erase head being wider than the record head in its effective area of contact with the record member.

Another and still further object of the present invention is to provide a novel electromagnetic transducer head assembly including an erase head, a record head, and a play-back head arranged in a row over which a record member is arranged to successively pass in a direction to cross the erase head first, then the record head, and then the play-back head; and in which the width of each successive head is less than the previous one.

Still another and further object of the present invention is to provide a novel magnetic recorder having a plurality of electromagnetic transducer heads distinctly arranged and shaped with respect to each other.

The novel features which I believe to be characteristic of my invention are set forth with particularity in the appended claims. My invention itself, however, both as to its organization, manner of construction, and method of operation, together with further objects and advantages thereof, may best be understood by reference to the following description taken in connection with the accompanying drawing, in which:

Figures 1, 2, 3, 4, 5:
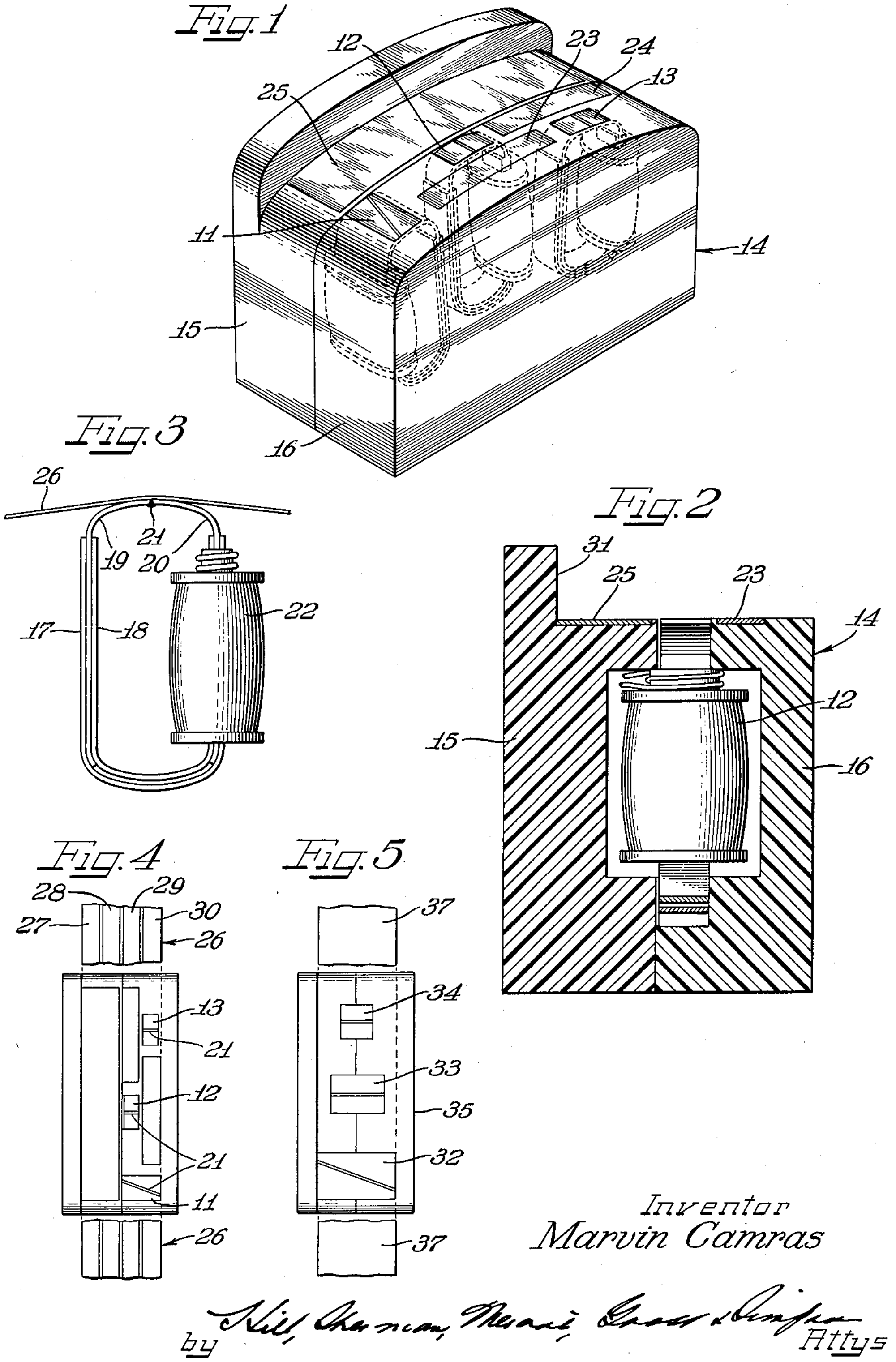
Figure 1 is an isometric view showing an assembly of electromagnetic transducer heads embodying the novel and distinctive characteristics of the present invention.
Figure 2 is a vertical sectional view taken along the line II—II of Figure 1.
Figure 3 is a front elevational view of one of the electromagnetic transducer heads of the head assembly shown in Figure 1.
Figure 4 is a diagrammatic plan view of the head assembly shown in Figures 1 to 3, with a magnetic record member partially broken away.
Figure 5 is a view similar to Figure 4, but illustrating a modified form of the present invention.

This application is a continuation-in-part of my copending application, Serial No. 719,385, for "Binaural Magnetic Recorder," filed December 31, 1946, and of my copending application, Serial No. 771,494, for "Magnetic Sound Apparatus," filed August 30, 1947, both of which are assigned to the same assignee.

The structural arrangement of one embodiment of the present invention is illustrated in detail in Figures 1, 2 and 3 of the drawing. More particularly, there is shown therein a head assembly 10 for a binaural system having three electromagnetic transducer heads 11, 12 and 13. These three heads 11, 12 and 13 are all mounted together in a Bakelite or other suitable housing 14 composed of two parts 15 and 16. The head assembly 10 is arranged to be used in conjunction with a multiple track magnetic record member 26 having two sets of binaural tracks.

As shown particularly in Figure 3, each electromagnetic transducer head includes two U-shaped core members 17 and 18, and two inverted L-shaped core members 19 and 20. The vertical legs on each L-shaped member 19 and 20 extend down between the upstanding legs of the two U-shaped members 17 and 18 in snug, nested engagement therewith. The L-shaped members 19 and 20 have their short legs projecting toward each other to form poles with a non-magnetic gap 21 lying therebetween.

At least one electric coil 22 is mounted on the core structure. The core structures of each of the magnetic transducer heads 11, 12 and 13 are similar except that the core structure of the erase head 11 is wider than the core structure of either head 12 or head 13. It will furthermore be observed that the gap 21 of the erase head 11 is on a slight diagonal, while the gap 21 of the heads 12 and 13 is disposed at right angles to the path of travel of the record member.

In addition to the heads 11, 12 and 13 of the head assembly 10, there is also provided three magnetic keepers 23, 24 and 25, which are formed of a high permeability, low coercive force material. The keeper 23 lies adjacent the head 12 and extends from a position near the erase head 11 to a position near the head 13. The keeper 24 lies opposite the head 13 and extends from the head 12 to a position beyond the location of the head 13. The keeper 25 is of a width slightly greater than half the width of the tape magnetic record member 26 which is arranged to pass over the head assembly. The use of these magnetic keepers in this head assembly tends to eliminate cross-talk and unwanted pick-up or play-back between adjacent channels on the tape 26, it being noted that with the head assembly illustrated, four channels are provided on the tape 26, by virtue of the relative dimensions and positions of the heads 12 and 13. This is diagrammatically illustrated in Figure 4, where a plan view shows the head 12 occupying a position slightly less than one-quarter the width of the tape, as does likewise head 13.

While four sound tracks are diagrammatically illustrated in Figure 4 of the drawing, it will be understood that the tape usually contains a continuous coating from edge to edge of magnetizable powdered material held to a non-magnetic backing or base member by some suitable binder. The channels are diagrammatically indicated as 27, 28, 29, and 30 and merely show the regions of the tape across its width which have recordings already thereon or are regions which will be recorded thereon by first passing the tape in one direction over the head, and specifically, over first the erase head end of the assembly and then over the succeeding recording head. The tape 26 is thereafter reversed end-to-end so as to permit the tape to again be passed in the same direction over the head assembly, but this time with the other half of the tape being recorded on in a pair of channels or sound tracks. It will, of course, be understood by those skilled in the art that the side of the tape record member 26 which has the coating of magnetizable material thereon will be the side which passes in contact with the upper surface of the head assembly 10 as it passes thereover.

Referring now to Figure 2 of the drawing, it will be observed that the two parts 15 and 16 of the housing 14 are placed together to form a single enclosed housing surrounding the three heads 11, 12 and 13. These two housing members 15 and 16 are provided with confronting recessed portions into which the heads 11, 12 and 13 are assembled. The upper wall of the front housing member 16 is provided with suitable openings through which the pole portions of each of the heads 11, 12 and 13 project very slightly. Also mounted on the upper portion of the housing member 16 are the two keepers 23 and 24. These keepers are embedded in the upper surface of the housing member 16 so as to form substantially a continuous surface therewith or else very slightly higher so as to be sure to effect good contact with the record member 26 as it passes thereover. It will be noted that the keeper 23 is arranged to lie against the track 30, while the keeper 24 is arranged to lie against the track 29.

The rear housing member 15 is quite similar to the front housing member 16 but includes an upstanding flange or shoulder 31 which acts as a guide for the magnetic record member 26 as it passes across the head assembly. The upper wall of the rear housing member 15 is provided with a magnetic keeper 25 which extends substantially over the entire upper wall of this rear housing member. It is to be noted that this magnetic keeper 25 is arranged to lie against the tracks 27 and 28 which are not being used at the time the record member passes over the head assembly as shown in Figure 4.

As previously pointed out, the head assembly 10 as illustrated in Figure 1 is provided with three electromagnetic transducer heads 11, 12 and 13. While the general structure of each of these electromagnetic transducer heads forms no part of the present inventions, it is to be remembered that the relative physical dimension of the pole portions of each of these heads do form a part of the present invention as does the arrangement of the non-magnetic gaps which lie between the confronting pole portions of each head. These electromagnetic transducer heads may have a ring-type core structure and one or more energizing coils as is suggested in Figure 3.

With a head assembly such as shown in Figures 1 to 4 of the drawing, or a head assembly such as shown in Figure 5 of the drawing, a very marked improvement in the recording and reproducing process is effected by having each successive head narrower than the preceding head. Thus, where only a recording operation is taking place, the erase head is substantially wider than the record head. Where a head assembly is provided (such as shown in Figure 5) including an erase head, a record head, and a play-back or monitoring head, a very marked improvement is obtained by having each of the successive heads narrower than the preceding head. By having the erase head wider than the record head, you are always assured of providing a fringe erasing effect at the side edges of the record head, and thus having a completely erased area on the tape not only in the region where it is in direct contact with the recording head, but also in the immediately adjacent regions where some recording is bound to take place due to the fact that the recording field will not strictly be confined to the exact width dimension of the pole pieces of the recording head.

By having the monitoring or play-back head, when one is used, smaller in width than the recording head, you also avoid the fringe side effect which is otherwise present when the monitoring head is the same width as the recording head.

It will be observed, particularly from Figure 4, that the erase head 11 extends in from one edge of the tape 26 toward the center over a single lane of intelligence only, while a record or play-back head 13 extends in from substantially the same edge but not as far as the erase head 11. This avoids the possibility of incomplete erasure caused by a slight tape misalignment or a slight head misalignment, but does not interfere with adjacent channels containing other intelligence. Thus, the requirement of the erase head is that it shall erase only one incremental length of tape at a time. Lack of erasure of even .001 inch of track width will produce a very objectionable signal in subsequent reproduction. It should be noted that in Figure 4, the single lane of intelligence is made up of two tracks since a binaural system is shown. Where a conventional recording is used, the lane of intelligence, of course, will be formed by single track only.

An embodiment of the present invention is disclosed in my copending application Serial No. 67,019, filed December 23, 1948, now U. S. Patent No. 2,710,662 issued June 14, 1955.

It will be understood that modifications and variations may be effected without departing from the scope of the novel concepts of the present invention.

I claim as my invention:

1. An electromagnetic transducer head assembly comprising magnetic erase head means having confronting poles means displaced longitudinally of the direction of travel of a record member thereover, said erase head pole means including pole portions engaging each of a pair of adjacent channels on the same side of the record member, first and second electromagnetic transducer heads, each disposed for engaging one of the adjacent channels of the record member after the channels have crossed said erase head means, said transducer heads each including a pair of confronting poles displaced longitudinally in the direction of travel of the record member and on the same side of the record member, and the poles of said first transducer head being laterally offset from the poles of said second transducer head, the confronting pole means of said erase head means being substantially wider than the sum of the widths of the confronting poles of the two transducer heads, and the portion of the erase head pole means contacting each channel of the record member extending laterally beyond both sides of the poles of the transducer head associated with the channel.

2. An electromagnetic transducer head assembly for binaural magnetic recorders comprising a mounting, an electromagnetic erase head carried on said mounting and including a pair of confronting poles displaced longitudinally of the direction of travel of a record member thereover, said erase head poles being disposed on the same side of said record member and of width to overlie two channels of the record member, first and second electromagnetic transducer heads carried on said mounting in positions where the two channels of the record member will cross the respective transducer heads after the channels have crossed said erase head, said transducer heads each including a pair of confronting pole portions displaced longitudinally in the direction of travel of the record member and on the same side thereof, and the pole portions of said first transducer head being laterally offset from the pole portions of said second transducer head, the poles of said erase head being substantially wider than the sum of the widths of the confronting pole portions of the two transducer heads but of width to extend only over the two channels of the record member cooperating respectively with said transducer heads, and the portion of the erase head poles contacting each channel of the record member extending laterally beyond both sides of the pole portions of the transducer head associated with the channel, and means for receiving binaurally related signals operatively connected with said transducer heads.

3. An electromagnetic transducer head assembly comprising a housing having a longitudinally extending record-engaging surface for receiving a tape magnetic record member having dual channels, said housing having a guide shoulder at one side of said record-engaging surface for guiding one edge of the record member, an electromagnetic erase head mounted in said housing and including a pair of confronting poles displaced longitudinally of the direction of travel of the record member thereover, said poles of said erase head being disposed on the same side of said record member and lying flush with said record-engaging surface of the housing, the poles of said erase head extending over only two channels of the record member as the record member travels over said record engaging surface with an edge of the record member guided by said shoulder, first and second electromagnetic transducer heads mounted in said housing in positions to contact the two channels contacted by said erase head, said transducer heads each including a pair of confronting pole portions displaced longitudinally in the direction of travel of the record member and on the same side thereof, the pole portions of said first record head being laterally offset from the pole portions of said second record head, and the pole portions of said transducer heads lying flush with the record-engaging surface of the housing, and the portion of the erase head poles contacting each channel of the record member extending laterally beyond both sides of the pole portions of the transducer head contacting the channel.

4. An electromagnetic transducer head assembly comprising a housing having a longitudinally extending record-engaging surface for receiving a tape magnetic record member having a pair of dual channels, said housing having a guide shoulder at one side of said record-engaging surface for guiding one edge of the record member, an electromagnetic erase head mounted in said housing and including a pair of confronting poles displaced longitudinally of the direction of travel of the record member thereover, said poles of said erase head being disposed on the same side of said record member and lying flush with said record-engaging surface of the housing, the poles of said erase head extending over only two channels of the record member as the record member travels over said record engaging surface with an edge of the record member guided by said shoulder, first and second electromagnetic transducer heads mounted in said housing in positions to contact the two channels contacted by said erase head, said transducer heads each including a pair of confronting pole portions displaced longitudinally in the direction of travel of the record member and on the same side thereof, the pole portions of said first transducer head being laterally offset from the pole portions of said second transducer head, the pole portions of said transducer heads lying flush with the record-engaging surface of the housing, and the portion of the erase head poles contacting each channel of the record member extending laterally beyond both sides of the pole portions of the transducer head contacting the channel; the record-engaging surface, guide shoulder, erase head poles, and transducer head pole portions being constructed and arranged to receive one pair of channels thereover for one longitudinal orientation of the respective ends of the record member and to receive the other pair of channels thereover when the respective ends of the record member are reversed with respect to said heads.

5. An electromagnetic transducer head assembly for a multi-channel tape magnetic record member, comprising an electromagnetic erase head including a pair of confronting poles displaced longitudinally of the direction of travel of a record member thereover, said erase head poles being disposed on the same side of said record member and engaging two channels of the record member, and an electromagnetic transducer head disposed in the path of travel of a channel of the record member traveling over said erase head, said transducer head including a pair of confronting pole portions displaced longitudinally of each other in the direction of travel of the record member and disposed on the same side of the record member, and the portion of the erase head poles contacting said one channel of the record member extending laterally beyond both sides of the pole portions of the transducer head contacting said channel.

References Cited in the file of this patent

UNITED STATES PATENTS

| | | |
|---|---|---|
| 2,213,246 | Heller | Sept. 3, 1940 |
| 2,419,195 | Begun | Apr. 22, 1942 |
| 2,497,654 | Begun | Feb. 14, 1950 |
| 2,523,576 | Kornei | Sept. 26, 1950 |
| 2,532,803 | Faus | Dec. 5, 1950 |
| 2,532,917 | Howell | Dec. 5, 1950 |
| 2,538,892 | Begun | Jan. 23, 1951 |